US008691910B2

(12) United States Patent
Hasegawa et al.

(10) Patent No.: US 8,691,910 B2
(45) Date of Patent: Apr. 8, 2014

(54) CURABLE SILICONE COMPOSITION

(75) Inventors: Chiichiro Hasegawa, Ichihara (JP);
Makoto Yoshitake, Funabashi (JP);
Hiroshi Akitomo, Ichihara (JP)

(73) Assignee: Dow Corning Toray Company, Ltd., Chiyoda-Ku, Tokyo (JP)

(*) Notice: Subject to any disclaimer, the term of this patent is extended or adjusted under 35 U.S.C. 154(b) by 0 days.

(21) Appl. No.: 12/671,388

(22) PCT Filed: Jul. 30, 2008

(86) PCT No.: PCT/JP2008/064080
§ 371 (c)(1),
(2), (4) Date: Dec. 8, 2010

(87) PCT Pub. No.: WO2009/017251
PCT Pub. Date: Feb. 5, 2009

(65) Prior Publication Data
US 2011/0077344 A1 Mar. 31, 2011

(30) Foreign Application Priority Data
Jul. 31, 2007 (JP) ................................. 2007-200140

(51) Int. Cl.
*C08L 83/07* (2006.01)

(52) U.S. Cl.
USPC .......................................... 524/500; 525/478

(58) Field of Classification Search
None
See application file for complete search history.

(56) References Cited

U.S. PATENT DOCUMENTS

| 3,284,406 A * | 11/1966 | Nelson .............................. 528/31 |
| 3,294,725 A | 12/1966 | Findlay et al. |
| 3,425,967 A * | 2/1969 | Modic .............................. 521/123 |
| 3,436,366 A * | 4/1969 | Modic .............................. 524/862 |
| 3,989,666 A | 11/1976 | Niemi |
| 4,189,545 A | 2/1980 | Modic |
| 4,221,688 A | 9/1980 | Johnson et al. |
| 4,248,751 A | 2/1981 | Willing |
| 4,391,921 A | 7/1983 | Johnson |
| 4,427,811 A | 1/1984 | Elias et al. |
| 4,472,470 A | 9/1984 | Modic |
| 4,473,667 A | 9/1984 | Sands |
| 4,500,584 A | 2/1985 | Modic |
| 4,529,789 A | 7/1985 | Kroupa |
| 4,535,141 A * | 8/1985 | Kroupa ............................ 528/15 |
| 4,555,529 A | 11/1985 | Lee et al. |
| 4,559,369 A | 12/1985 | Bauman et al. |
| 4,572,917 A | 2/1986 | Graiver et al. |
| 4,584,324 A | 4/1986 | Bauman et al. |
| 4,624,900 A | 11/1986 | Fau |
| 4,689,248 A * | 8/1987 | Traver et al. .................. 427/168 |
| 4,741,861 A | 5/1988 | Okada et al. |
| 4,753,978 A | 6/1988 | Jensen |
| 4,788,240 A | 11/1988 | Fujimoto |
| 4,845,164 A | 7/1989 | Gutek |
| 4,876,805 A | 10/1989 | Peoples |
| 4,882,398 A * | 11/1989 | Mbah ............................ 525/478 |
| 4,891,393 A | 1/1990 | Kazuo et al. |
| 5,135,960 A | 8/1992 | Higuchi et al. |
| 5,153,231 A | 10/1992 | Bouquet et al. |
| 5,246,973 A | 9/1993 | Nakamura et al. |
| 5,332,762 A | 7/1994 | Maschberger et al. |
| 5,348,392 A | 9/1994 | Bouquet et al. |
| 5,362,761 A | 11/1994 | Uragami et al. |
| 5,373,078 A * | 12/1994 | Juen et al. ....................... 528/15 |
| 5,399,402 A | 3/1995 | Inoue et al. |
| 5,717,010 A * | 2/1998 | Ward et al. .................... 523/213 |
| 5,764,181 A * | 6/1998 | Fey et al. .......................... 342/4 |
| 5,827,921 A | 10/1998 | Osawa et al. |
| 5,908,878 A * | 6/1999 | Baity et al. .................... 523/203 |
| 5,977,226 A * | 11/1999 | Dent et al. ..................... 524/267 |
| 6,084,002 A | 7/2000 | Nicholson et al. |
| 6,124,407 A * | 9/2000 | Lee et al. ....................... 525/478 |
| 6,262,170 B1 * | 7/2001 | Kilgour et al. ................. 524/731 |
| 7,459,213 B2 | 12/2008 | Yamamoto et al. |

(Continued)

FOREIGN PATENT DOCUMENTS

| CN | 1802417 A | 7/2006 |
| CN | 101107324 A | 1/2008 |

(Continued)

OTHER PUBLICATIONS

English language translation and abstract for JP 2005-042099 extracted from PAJ database, dated May 21, 2010, 106 pages.
English language translation and abstract for JP 2006-328102 extracted from PAJ database, dated May 21, 2010, 54 pages.
English language translation and abstract for JP 2006-335857 extracted from PAJ database, dated May 21, 2010, 39 pages.
English language translation and abstract for JP 2007-131694 extracted from PAJ database, dated May 21, 2010, 38 pages.
PCT International Search Report for PCT/JP2008/064080, dated Dec. 22, 2008, 3 pages.
English language abstract and machine-assisted English translation for JP 2002-114860 extracted from the PAJ database on Mar. 12, 2013, 50 pages.

(Continued)

Primary Examiner — Robert S Loewe
(74) Attorney, Agent, or Firm — Howard & Howard Attorneys PLLC

(57) ABSTRACT

A curable silicone composition comprising: an alkenyl-containing organopolysiloxane (A) that contains: a dialkylpolysiloxane (A-1) having on average at least 2 alkenyl groups in one molecule having a 25° C. viscosity in the range of 5,000 to 35,000 mPa·s, and a alkenyl-containing organopolysiloxane resin (A-2) consisting of $SiO_{4/2}$ units, $R^1{}_2R^2SiO_{1/2}$ units, and $R^1{}_3SiO_{1/2}$ units (where $R^1$ designates alkyl groups with 1 to 10 carbon atoms, and $R^2$ designates alkenyl groups) with the content of alkenyl groups ranging from 3.5 to 5.0 mass %, and with the ratio of the sum of the mole numbers of the $R^1{}_2R^2SiO_{1/2}$ units and $R^1{}_3SiO_{1/2}$ units to 1 mole of the $SiO_{4/2}$ units in the range from 0.5 to 1.4; an organopolysiloxane (B), wherein silicon-bonded hydrogen atoms are in an amount of at least 0.7 mass %; and a hydrosilylation catalyst (C). The composition is capable of forming a flex-resistant highly transparent cured silicone product with non-tacky surface.

13 Claims, No Drawings

(56) References Cited

U.S. PATENT DOCUMENTS

| | | | |
|---|---|---|---|
| 7,521,813 | B2 | 4/2009 | Kashiwagi et al. |
| 7,683,125 | B2 | 3/2010 | Shirasaki et al. |
| 7,687,563 | B2 | 3/2010 | Shirasaki et al. |
| 7,732,519 | B2 | 6/2010 | Shirasaki et al. |
| 7,767,754 | B2* | 8/2010 | Zhu et al. .................. 524/588 |
| 8,227,520 | B2 | 7/2012 | Shirasaki et al. |
| 2004/0152825 | A1 | 8/2004 | Yamamoto et al. |
| 2005/0006794 | A1 | 1/2005 | Kashiwagi et al. |
| 2006/0264583 | A1 | 11/2006 | Kashiwagi et al. |
| 2006/0293445 | A1* | 12/2006 | Araki et al. .................. 524/860 |
| 2007/0015868 | A1 | 1/2007 | Shirasaki et al. |
| 2007/0099007 | A1 | 5/2007 | Benayoun et al. |
| 2007/0123828 | A1 | 5/2007 | Propp |
| 2007/0129508 | A1* | 6/2007 | Kashiwagi .................. 525/478 |
| 2008/0021125 | A1 | 1/2008 | Shirasaki et al. |
| 2008/0160322 | A1* | 7/2008 | Mochizuki et al. .......... 428/447 |
| 2009/0118441 | A1* | 5/2009 | Yamamoto et al. .......... 525/478 |
| 2009/0263936 | A1 | 10/2009 | Fujisawa et al. |
| 2009/0292056 | A1 | 11/2009 | Shirasaki et al. |
| 2010/0197870 | A1 | 8/2010 | Kashiwagi et al. |
| 2011/0021649 | A1 | 1/2011 | Sakuma et al. |
| 2011/0077344 | A1 | 3/2011 | Hasegawa et al. |
| 2011/0190410 | A1 | 8/2011 | Nozoe et al. |
| 2011/0281123 | A1 | 11/2011 | Yoshida et al. |
| 2011/0288246 | A1 | 11/2011 | Hasegawa et al. |
| 2011/0294950 | A1 | 12/2011 | Hasegawa et al. |

FOREIGN PATENT DOCUMENTS

| | | |
|---|---|---|
| EP | 0240162 A2 | 10/1987 |
| EP | 0522585 A1 | 1/1993 |
| EP | 0636662 A2 | 2/1995 |
| EP | 0997498 A1 | 5/2000 |
| EP | JP 2002-114860 A | 4/2002 |
| EP | 1627900 A1 | 2/2006 |
| EP | 1724308 A1 | 11/2006 |
| JP | 54135865 A | 10/1979 |
| JP | 59012830 A | 1/1984 |
| JP | 59012832 A | 1/1984 |
| JP | 61103945 A | 5/1986 |
| JP | 61108640 A | 5/1986 |
| JP | 02-151660 A | 6/1990 |
| JP | 5070692 A | 3/1993 |
| JP | 5209080 A | 8/1993 |
| JP | 06-207038 A | 7/1994 |
| JP | 6287348 A | 10/1994 |
| JP | 07-041679 | 2/1995 |
| JP | 07-053872 A | 2/1995 |
| JP | 7247436 A | 9/1995 |
| JP | 7122000 B | 12/1995 |
| JP | 11-130963 A | 5/1999 |
| JP | 11-236508 A | 8/1999 |
| JP | 2000-129132 A | 5/2000 |
| JP | 2001-164187 A | 6/2001 |
| JP | 2003-012925 A | 1/2003 |
| JP | 2003-096223 A | 4/2003 |
| JP | 2004-091569 A | 3/2004 |
| JP | 2004-143332 A | 5/2004 |
| JP | 2004-346248 A | 12/2004 |
| JP | 2005042099 A | 2/2005 |
| JP | 2005-062534 A | 3/2005 |
| JP | 2005-161132 A | 6/2005 |
| JP | 2005-255968 A | 9/2005 |
| JP | 2006/350634 A | 12/2006 |
| JP | 2006328102 A | 12/2006 |
| JP | 2006335857 A | 12/2006 |
| JP | 2007131694 A | 5/2007 |
| JP | 2008-163060 A | 7/2008 |
| JP | 2008214625 A | 9/2008 |
| JP | 2010-018662 A | 1/2010 |
| WO | WO 03102063 A2 | 12/2003 |
| WO | WO 2004074378 A1 | 9/2004 |
| WO | WO 2004/104105 A1 | 12/2004 |
| WO | WO 2005085357 A1 | 9/2005 |
| WO | WO 2007055395 A1 | 5/2007 |
| WO | WO 2008096882 A1 | 8/2008 |
| WO | WO 2010013847 A1 | 2/2010 |
| WO | WO 2010/087522 A1 | 8/2010 |
| WO | WO 2010/087523 A1 | 8/2010 |
| WO | WO 2010/087525 A1 | 8/2010 |

OTHER PUBLICATIONS

English language abstract and machine-assisted English translation for JP 2003-096223 extracted from the PAJ database on Mar. 14, 2013, 46 pages.

English language abstract and machine-assisted English translation for JP 2004-091569 extracted from the PAJ database on Mar. 14, 2013, 29 pages.

English language abstract and machine-assisted English translation for JP 2004-143332 extracted from the PAJ database on Mar. 14, 2013, 36 pages.

English language abstract and machine-assisted English translation for JP 2004-346248 extracted from the PAJ database on Dec. 11, 2009, 42 pages.

English language abstract and machine-assisted English translation for JP 2005-062534 extracted from the PAJ database on Dec. 11, 2009, 45 pages.

English language abstract and machine-assisted English translation for JP 2005-255968 extracted from the PAJ database on Mar. 14, 2013, 44 pages.

English language abstract and machine-assisted English translation for JP 2008-163060 extracted from the PAJ database on Mar. 14, 2013, 52 pages.

English language abstract for JP 2008214625 extracted from the espacenet.com database on Mar. 14, 2013, 17 pages.

English language abstract not available for JP 5070692; however, see English language equivalent US 5,348,392. Original document extracted from the espacenet.com database on Mar. 14, 2013, 9 pages.

English language abstract for JP 5209080 extracted from the espacenet.com database on Mar. 14, 2013, 7 pages.

English language abstract and machine-assisted English translation for JP 06-207038 extracted from the PAJ database on Aug. 2, 2011, 42 pages.

English language abstract for JP 6287348 extracted from the espacenet.com database on Mar. 14, 2013, 12 pages.

English language abstract for JP 7247436 extracted from the espacenet.com database on Mar. 14, 2013, 7 pages.

English language abstract and machine-assisted English translation for JP 11-130963 extracted from the PAJ database on Sep. 16, 2011, 31 pages.

English language abstract and machine-assisted English translation for JP 11-236508 extracted from the PAJ database on Aug. 2, 2011, 37 pages.

English language abstract not available for JP 54135865; however, see English language equivalent US 4,189,545. Original document extracted from the espacenet.com database on Mar. 14, 2013, 13 pages.

English language abstract not available for JP 59012832; however see English language equivalent US 4,391,921. Original document extracted from the espacenet.com database on Mar. 14, 2013, 8 pages.

English language abstract not available for JP 61103945; however, see English language equivalent US 4,572,917. Original document extracted from the espacenet.com database on Mar. 14, 2013, 12 pages.

English language abstract not available for JP 61108640; however, see English language equivalent US 4,584,324. Original document extracted from the espacenet.com database on Mar. 14, 2013, 14 pages.

English language abstract not available for JP 7122000; however, see English language equivalent US 5,332,762. Orginal document extracted from the espacenet.com database on Mar. 14, 2013, 12 pages.

English language abstract and machine-assisted English translation for WO 03102063 extracted from the espacenet.com database on Mar. 15, 2013, 36 pages.

(56) References Cited

OTHER PUBLICATIONS

English language abstract for WO 2004074378 extracted from the espacenet.corn database on Mar. 14, 2013, 33 pages.
English language abstract for WO 2005085357 extracted from the espacenet.corn database on Mar. 14, 2013, 33 pages.
International Search Report for Application No. PCT/JP2004/002883 dated Jul. 6, 2004, 4 pages.
International Search Report for Application No. PCT/JP2009/063910 dated Dec. 15, 2009, 4 pages.
International Search Report for Application No. PCT/JP2008/052203 dated May 16, 2008, 2 pages.
English language abstract not available for JP59012830; however, see English language equivalent US 4,473,667. Original document extracted from the espacenet.com database on Mar. 14, 2013, 9 pages.
English language abstract and translation for JP 07-041679 extracted from the PAJ database on Aug. 26, 2011, 29 pages.
International Search Report for Application No. PCT/JP2010/051660 dated Jun. 2, 2010, 3 pages.
International Search Report for Application No. PCT/JP2010/051661 dated Jun. 2, 2010, 3 pages.
International Search Report for Application No. PCT/JP2010/051663 dated Jun. 2, 2010, 3 pages.
English language abstract for CN 101107324 extracted from the espacenet.com database on Oct. 26, 2012, 8 pages.
English language abstract for JP 02-151660 extracted from the espacenet.com database on Oct. 18, 2012, 19 pages.
English language abstract for JP 59012830 not available; however, see English language equivalent US 4,473,667. Original document extracted from the espacenet.com database on Sep. 16, 2011, 9 pages.
English language abstract for WO 2010013847 extracted from the espacenet.corn database on Sep. 16, 2011, 42 pages.
English language abstract not available for CN 1802417; however, see English language equivalent US 2009/0292056. Orginal document extracted from the espacenet.com database on Oct. 28, 2013, 17 pages.
English language abstract and machine-assisted English translation for JP 07-053872 extracted from the PAJ database on Oct. 14, 2013, 34 pages.
English language abstract and machine-assisted English translation for JP 2000-129132 extracted from the PAJ database on Oct. 14, 2013, 45 pages
English language abstract and machine-assisted English translation for JP 2001-164187 extracted from the PAJ database on Oct. 14, 2013, 34 pages.
English language abstract and machine-assisted English translation for JP 2003-012925 extracted from the PAJ database on Oct. 16, 2013, 26 pages.
English language abstract and machine-assisted English translation for JP 2005-161132 extracted from the PAJ database on Oct. 14, 2013, 49 pages.
English language abstract and machine-assisted translation for JP 2006/350634 extracted from the PAJ database on Oct. 28, 2013, 109 pages.
English language abstract and machine-assisted English translation for JP 2010-018662 extracted from the PAJ database on Oct. 16, 2013, 40 pages.
English language abstract for WO 2004/104105 extracted from the espacenet.com database on Oct. 28, 2013, 28 pages.

* cited by examiner

CURABLE SILICONE COMPOSITION

TECHNICAL FIELD

The present invention relates to a curable silicone composition which gives a transparent cured silicone product, and more specifically, to a curable silicone composition containing an organopolysiloxane resin which gives a flex-resistant, highly transparent cured silicone product.

BACKGROUND ART

Curable silicone compositions that contain an organopolysiloxane resin and are suitable for obtaining transparent cured silicone products are known in the art. For example, Japanese Unexamined Patent Application Publication (hereinafter referred to as Kokai) 2005-042099 (equivalent to US 2005/0006794 A1) discloses a silicone rubber composition which is comprised of an organopolysiloxane having at least two aliphatic unsaturated bonds in the molecule, an organopolysiloxane of a resin structure composed of $SiO_2$ units (hereinafter referred to as Q units), $R_3SiO_{0.5}$ units that contain two or three vinyl groups (hereinafter referred to as M units), and $R_3SiO_{0.5}$ units that may be without or with one vinyl group (however, in addition to vinyl groups, R in the above formulae may also designate univalent hydrocarbon groups without aliphatic unsaturated bonds, such as methyl groups); an organopolysiloxane with two or more silicon-bonded hydrogen atoms in the molecule; and a platinum group metal catalyst.

Kokai 2006-335857 discloses a polyorganosiloxane composition suitable for obtaining a transparent cured silicone product, the composition comprising: a linear polyorganosiloxane that contains silicon-bonded alkenyl groups and has viscosity ranging from 10 to 10,000 $mm^2/s$ at 23° C.; a branched polyorganosiloxane composed of Q units, M units with one vinyl group, and M units which are free of aliphatic unsaturated bonds; a polyalkylhydrogensiloxane consisting of Q units, M units having one silicon-bonded hydrogen atom, and M units which are free of silicon-bonded hydrogen atoms; and a platinum group metal catalyst.

Kokai 2007-131694 discloses a curable silicone composition comprising: a diorganopolysiloxane having at least two alkenyl groups in the molecule; organopolysiloxane resins of two types with different mass-average molecular weights which are composed of Q units, M units having one vinyl group, and M units which are free of unsaturated aliphatic bonds; an organopolysiloxane that contains at least two silicon-bonded hydrogen atoms in the molecule; and a hydrosilylation catalyst.

Kokai 2006-328102 (equivalent to US 2006/0264583 A1) discloses a lens-forming silicone resin composition comprising the following indispensable components and suitable for forming colorless transparent cured products: an organopolysiloxane having viscosity no less than 100 mPa·s at 25° C. and containing at least two unsaturated aliphatic bonds in the molecule; and an organohydrogenpolysiloxane having in the molecule at least three $H(CH_3)_2SiO_{1/2}$ units; and a platinum group metal catalyst.

However, cured silicone products obtained by curing the aforementioned compositions have poor flex-resistant and can be easily damaged during molding or in assembling operations. Furthermore, they are not suitable for applications that involve bending and require that the product possess a sufficient flexural strength.

DISCLOSURE OF INVENTION

It is an object of the present invention to provide a curable silicone composition suitable for forming a flex-resistant, highly transparent cured silicone products having non-tacky surfaces.

The curable silicone composition of the invention is characterized by its ability to form a flex-resistant, highly transparent cured silicone product having JIS K6253 type-A durometer hardness in the range of 77 to 95 and JIS K6251 elongation equal to or greater than 38%, the aforementioned curable silicone composition comprising:

100 parts by mass of an alkenyl-containing organopolysiloxane (A) comprising: a dialkylpolysiloxane (A-1) that constitutes 52 to 69 mass % of component (A), contains on average at least 2 alkenyl groups in one molecule and has a 25° C. viscosity in the range of 5,000 to 35,000 mPa·s; and an alkenyl-containing organopolysiloxane resin (A-2) that constitutes 31 to 48 mass % of component (A), consists essentially of $SiO_{4/2}$ units, $R^1{}_2R^2SiO_{1/2}$ units, and $R^1{}_3SiO_{1/2}$ units (where $R^1$ designates alkyl groups with 1 to 10 carbon atoms, and $R^2$ designates alkenyl groups), has the content of alkenyl groups ranging from 3.5 to 5.0 mass %, and the ratio of the sum of the mole numbers of the $R^1{}_2R^2SiO_{1/2}$ units and $R^1{}_3SiO_{1/2}$ units to 1 mole of the $SiO_{4/2}$ units ranging from 0.5 to 1.4;

an organopolysiloxane (B), wherein silicon-bonded hydrogen atoms are in an amount of at least 0.7 mass % and wherein silicon-bonded groups other than hydrogen atoms are alkyl groups having 1 to 10 carbon atoms {this component contains silicon-bonded hydrogen atoms in the amount of 0.5 to 5 moles per 1 mole of the total amount of alkenyl groups of component (A)}; and a catalytic quantity of a hydrosilylation catalyst (C).

In the above composition, it is recommended that component (B) is an organopolysiloxane comprising: an organopolysiloxane (B-1) that constitutes 50 to 100 mass % of component (B), contains at least 0.7 mass % of silicon-bonded hydrogen atoms, and consists essentially of $SiO_{4/2}$ units and $HR^3{}_2SiO_{1/2}$ units (where $R^3$ designates alkyl groups with 1 to 10 carbon atoms; and a linear-chain organopolysiloxane (B-2) that constitutes 0 to 50 mass % of component (B), wherein silicon-bonded hydrogen atoms are in an amount of at least 0.7 mass % and wherein silicon-bonded groups other than hydrogen atoms are alkyl groups having 1 to 10 carbon atoms.

The cured silicone product of the present invention is obtained by thermally curing the curable silicone composition. The product is flex-resistant, highly transparent, and is characterized by having JIS K6253 type-A durometer hardness in the range of 77 to 95 and JIS K6251 elongation equal to or greater than 38%.

It is recommended that the cured silicone product of the invention should have type-A durometer hardness according to JIS K6253 preferably in the range of 80 to 90.

The composite cured silicone product of the invention may be an integral unit of a substrate and a cured silicone layer. The aforementioned integral unit can be obtained by applying a layer of curable silicone composition onto a substrate and then thermally curing the aforementioned curable silicone composition.

Since the curable silicone composition of the invention includes a specific alkenyl-containing diorganopolysiloxane and a specific alkenyl-containing organopolysiloxane resin, it is capable of producing a flex-resistant, highly transparent cured silicone product that has the non-tacky surface. Since the cured silicone products obtained by curing the composition of the invention are flex-resistant, they are subject to damage during molding and assembling to a lesser degree. Furthermore, the aforementioned cured products are suitable for use in applications that require flex-resistant, e.g., in operations that involves folding. The composition of the invention does not contain phenyl groups, e.g., silicon-bonded aryl groups. Therefore, exposure of a cured silicone product obtained from this composition to a high-temperature, high-humidity environment or to ultraviolet light will not impair transparency of the product.

BEST MODE FOR CARRYING OUT THE INVENTION

The alkenyl-containing organopolysiloxane (A) is the main component of the composition. This component comprises a dialkylpolysiloxane (A-1) that constitutes 52 to 69 mass % of component (A), contains on average at least 2 alkenyl groups in one molecule and has a 25° C. viscosity in the range of 5,000 to 35,000 mPa·s; and an alkenyl-containing organopolysiloxane resin (A-2) that constitutes 31 to 48 mass % of component (A), consists essentially of $SiO_{4/2}$ units, $R^1_2R^2SiO_{1/2}$ units, and $R^1_3SiO_{1/2}$ units (where $R^1$ designates alkyl groups with 1 to 10 carbon atoms, and $R^2$ designates alkenyl groups), has the content of alkenyl groups ranges from 3.5 to 5.0 mass %, and has the ratio of the sum of the mole numbers of the $R^1_2R^2SiO_{1/2}$ units and $R^1_3SiO_{1/2}$ units to 1 mole of the $SiO_{4/2}$ units ranging from 0.5 to 1.4.

Constituent (A-1) contains in one molecule on average at least two alkenyl groups. This constituent has essentially a linear molecular structure, though a part of the molecular chains may be branched. The alkenyl groups of constituent (A-1) may be represented by vinyl, allyl, isopropenyl, butenyl, hexenyl, and cyclohexenyl groups. Vinyl groups are preferable. There are no special restrictions with regard to the bonding positions of the alkenyl groups, and they can be bonded to the molecular terminals and/or to side molecular chains, but the terminal positions are preferable. The alkyl groups of constituent (A-1) can be exemplified by methyl, ethyl, propyl, cyclopentyl, cyclohexyl, or similar alkyl groups having 1 to 10 carbon atoms. The methyl groups are preferable.

Constituent (A-1) may have viscosity of 5,000 to 35,000 mPa·s, preferably 7,000 to 35,000 mPa·s, more preferably, 10,000 to 35,000 mPa·s, and most preferably, 11,000 to 30,000 mPa·s at 25° C. When constituent (A-1) is a mixture of two or more types of alkenyl-containing dialkylpolysiloxanes, viscosity of the mixture should be in the range of 5,000 to 35,000 mPa·s, more preferably, 10,000 to 35,000 mPa·s, and most preferably, 11,000 to 30,000 mPa·s at 25° C. If viscosity of constituent (A-1) at 25° C. is below the recommended lower limit, this will impair transparency of the cured silicone product, and if viscosity at 25° C. exceeds the recommended upper limit, this will impair workability of the composition. When the cured silicone product obtained by curing the composition of the invention should have JIS K6253 type-A durometer hardness in the range of 80 to 95, it is recommended to provide viscosity of constituent (A-1) in the range of 11,000 to 35,000. In this case it will be possible to improve flex-resistant of the cured product obtained by curing the composition.

Such a diorganopolysiloxane of constituent (A-1) can be exemplified by the following compounds: a dimethylpolysiloxane capped at both molecular terminals with dimethylvinylsiloxy groups; a copolymer of a methylvinylsiloxane and a dimethylsiloxane capped at both molecular terminals with dimethylvinylsiloxy groups; a methylvinylpolysiloxane capped at both molecular terminals with trimethylsiloxy groups; a copolymer of a methylvinylsiloxane and dimethylsiloxane capped at both molecular terminals with trimethylsiloxy groups; or combination of two or more of the above compounds.

It is recommended that the content of constituent (A-1) in the composition be in the range of 52 to 69 mass %, preferably 55 to 65 mass % of component (A). If constituent (A-1) is contained in an amount less than the recommended lower limit, this will impair flex-resistant of the cured silicone product. If, on the other hand, constituent (A-1) is contained in an amount exceeding the recommended upper limit, this will reduce hardness of the cured silicone product and generate tackiness on its surface.

The alkenyl-containing organopolysiloxane resin of constituent (A-2) is used for imparting sufficient hardness and flex-resistant to the cured silicone product. This constituent consists essentially of $SiO_{4/2}$ units, $R^1_2R^2SiO_{1/2}$ units, and $R^1_3SiO_{1/2}$ units, where $R^1$ designates methyl, ethyl, propyl, cyclopentyl, cyclohexyl, or similar alkyl groups having 1 to 10 carbon atoms, and $R^2$ designates vinyl, allyl, isopropenyl, butenyl, hexenyl, or cyclohexenyl groups. Vinyl groups are preferable.

It is preferable that the content of alkenyl groups in the alkenyl-containing organopolysiloxane resin of constituent (A-2) be in the range of 3.5 to 5.0 mass %, and preferably in the range of 4.0 to 5.0 mass %. If the content of alkenyl groups in this constituent is below the recommended lower limit, this will reduce hardness of the cured silicone product obtained by curing the composition, and will develop tackiness on the surface of the product. If, on the other hand, the content of alkenyl groups exceeds the recommended upper limit, this will impair flex-resistant of the cured product obtained from the composition. Constituent (A-2) may also be comprised of a mixture of two or more alkenyl-containing organopolysiloxane resins of different types but the content of alkenyl groups in such a mixture should be in the range of 3.5 to 5.0 mass %, and preferably in the range of 4.0 to 5.0 mass %.

In constituent (A-2), the ratio of the sum of the mole numbers of the $R^1_2R^2SiO_{1/2}$ units and $R^1_3SiO_{1/2}$ units to 1 mole of the $SiO_{4/2}$ units should range from 0.5 to 1.4, preferably from 0.5 to 1.2, and more preferably, from 0.6 to 1.0. If the ratio of the sum of the mole numbers of the $R^1_2R^2SiO_{1/2}$ units and $R^1_3SiO_{1/2}$ units to 1 mole of the $SiO_{4/2}$ units is below the recommended lower limit, this will either significantly increase viscosity of the composition and impair its workability, or will impair transparency of the cured silicone product. If, on the other hand, in constituent (A-2) the ratio of the sum of the mole numbers of the $R^1_2R^2SiO_{1/2}$ units and $R^1_3SiO_{1/2}$ units to 1 mole of the $SiO_{4/2}$ units exceeds the recommended upper limit, this will not provide the cured silicone product with sufficient flex-resistant. When constituent (A-2) is a mixture of two or more alkenyl-containing organopolysiloxane resins of different types, it is recommended that each componential alkenyl-containing organopolysiloxane resin has a corresponding ratio of the sum of the mole numbers of the $R^1_2R^2SiO_{1/2}$ units and $R^1_3SiO_{1/2}$ units to 1 mole of the $SiO_{4/2}$ units in the range of 0.5 to 1.4, preferably from 0.5 to 1.2, and more preferably, from 0.6 to 1.0.

It is recommended that constituent (A-2) should have a mass-average molecular weight referenced to polystyrene and measured by gel permeation chromatography in the range of 2,000 to 7,000, preferably in the range of 3,000 to 7,000, and more preferably in the range of 4,000 to 6,000. Constituent (A-2) may be comprised of a mixture of two or more different types of alkenyl-containing organopolysiloxane resins, but it is recommended that the componential organopolysiloxanes have their mass-average molecular weights referenced to polystyrene and measured by gel permeation chromatography in the range of 2,000 to 7,000, preferably in the range of 3,000 to 7,000, and more preferably in the range of 4,000 to 6,000.

It is recommended that constituent (A-2) be contained in the composition of the invention in the amount of 31 to 48 mass %, preferably 35 to 45 mass % of component (A). If the content of constituent (A-2) is less than the recommended lower limit, this will reduce hardness of the cured silicone product and generate stickiness on the product's surface. If, on the other hand, the content of constituent (A-2) exceeds the recommended upper limit, the composition will become too viscous and difficult to handle.

The organopolysiloxane of component (B) contains at least 0.7 mass % of silicon-bonded hydrogen atoms and functions as a cross-linking agent of the composition. If the content of the silicon-bonded hydrogen atoms in component (B) is below the recommended lower limit, this will either reduce hardness of the cured silicone product and develop stickiness on the product's surface, or will impair transparency of the product.

Component (B) may have a linear, partially branched linear, cyclic, or resinous molecular structure, of which the linear, partially branched linear, or resinous molecular structures are preferable. There are no special restrictions with regard to the position in which hydrogen atoms can be bonded to silicon atoms in component (B). For example, hydrogen atoms can be bonded to molecular terminals and/or to side molecular chains. Silicon-bonded groups other than hydrogen atoms that may be contained in component (B) can be exemplified by methyl, ethyl, propyl, cyclopentyl, cyclohexyl, or similar alkyl groups having 1 to 10 carbon atoms, of which methyl groups are preferable. This is because methyl groups have better miscibility with component (A) and provide better transparency of the cured silicone product obtained by curing the composition. There are no special restrictions with regard to viscosity of component (B), and this component may have kinematic viscosity in the range of 1 to 10,000 mm²/s, preferably in the range of 1 to 1,000 mm²/s.

A specific example of a preferable component (B) is an organopolysiloxane that comprises: an organopolysiloxane (B-1) that constitutes 50 to 100 mass % of component (B), contains at least 0.7 mass % of silicon-bonded hydrogen atoms, and consists essentially of $SiO_{4/2}$ units and $HR^3_2SiO_{1/2}$ wilts (where $R^3$ designates alkyl groups with 1 to 10 carbon atoms such as methyl, ethyl, propyl, cyclopentyl, cyclohexyl, or similar groups); and a linear-chain organopolysiloxane (B-2) that constitutes 0 to 50 mass % of component (B), wherein silicon-bonded hydrogen atoms are in an amount of at least 0.7 mass % and wherein silicon-bonded groups other than hydrogen atoms are alkyl groups having 1 to 10 carbon atoms.

In addition to $SiO_{4/2}$ units and $HR^3_2SiO_{1/2}$ units, constituent (B-1) may also contain $R^3_3SiO_{1/2}$ units. It is recommended that in constituent (B-1) the ratio of the total mole number of the $HR^3_2SiO_{1/2}$ units and the $R^3_3SiO_{1/2}$ units to 1 mole of the $SiO_{4/2}$ units be in the range of 1.5 to 2.5, preferably 1.8 to 2.2. A specific example of a preferable (B-1) is an organopolysiloxane of the following formula: $(SiO_{4/2})_4(H(CH_3)_2SiO_{1/2})_8$.

The silicon-bonded groups of the linear organopolysiloxane of constituent (B-2) other than silicon-bonded hydrogen atoms may be exemplified by methyl, ethyl, propyl, cyclopentyl, cyclohexyl, or similar alkyl groups having 1 to 10 carbon atoms, of which methyl groups are preferable. The molecular structure of constituent (B-2) is essentially linear, although it can be partially branched. A specific preferred examples of constituent (B-2) are the following: a copolymer of a methylhydrogensiloxane and a dimethylsiloxane capped at both molecular terminals with dimethylhydrogensiloxy groups; a methylhydrogenpolysiloxane capped at both molecular terminals with trimethylsiloxy groups; a copolymer of a methylhydrogensiloxane and a dimethylsiloxane capped at both molecular terminals with trimethylsiloxy groups; or mixtures of two or more of the above compounds.

Component (B) is added to the composition in an amount such that the content of silicon-bonded hydrogen atoms contained in this component is in the range of 0.5 to 5 moles, preferably 0.7 to 2.5 moles per 1 mole of the total amount of alkenyl groups of component (A). If component (B) is added in the amount less than the recommended lower limit, it will be difficult to provide sufficient curing of the composition. If, on the other hand, component (B) is added in the amount exceeding the recommended upper limit, this will impair flex-resistant and transparency of the cured silicone product obtained by curing the composition.

The hydrosilylation catalyst (C) is a component used to promote curing of the composition and can be represented by a platinum-type catalyst, rhodium-type catalyst, or a palladium-type catalyst, of which the platinum-type catalyst is most preferable. The following are examples of the platinum catalyst suitable for the invention: platinum fine powder, platinum black, platinum on a fine silica powder, platinum on activated carbon, chloroplatinic acid, alcohol solution of chloroplatinic acid, platinum/olefin complex, platinum/alkenylsiloxane complex, or other platinum-type compounds.

Component (C) is added to the present composition in a catalytic quantity. The catalyst is preferably added so as to provide about 0.01 to 1000 parts per million (ppm) of metal atoms based on the total weight of the composition. If the catalyst is added in the amount less than the recommended lower limit, it will be difficult to promote curing of the composition. If, on the other hand, the catalyst is used in the amount exceeding the recommended upper limit, this will not significantly improve the curing promotion effect but rather create problems associated with discoloration of the cured silicone product.

The composition may be further combined with various arbitrary components such as 1-ethynyl-1-cyclohexanol, 2-methyl-3-butyn-2-ol, 3,5-dimethyl-1-hexyn-3-ol, phenyl butynol, or a similar alkyne alcohol; 3-methyl-3-penten-1-yne, 3,5-dimethyl-3-hexen-1-yne or a similar enyne compound; 1,3,5,7-tetramethyl-1,3,5,7-tetravinyl cyclotetrasiloxane, 1,3,5,7-tetramethyl-1,3,5,7-tetravinyl cyclotetrasiloxane, benzotriazole or a similar curing retarder. There are no special restrictions with regard to the amount in which the curing retarder can be used, and the actual amount thereof will depend on molding and curing conditions. In general, however, in terms of mass units, it is recommended to add the curing retarder to the composition in the amount of 10 to 5,000 parts per million (ppm) per total weight of the composition.

Within the limits that are not in contradiction with the purposes of the present invention, the composition may also incorporate adhesion promoting agents, flame retarders, inorganic fillers, etc. In general, however, the use of adhesion promoting agents, flame retarders, and inorganic fillers is undesirable since they impair transparency of the cured silicone product.

When the cured silicone product of the composition is intended for use in the electric and electronic fields, it is recommended that the content of low-molecular-weight organopolysiloxane with molecular weight below 650 be in the composition equal to or less than 350 ppm.

There are no special restrictions with regard to viscosity of the composition at 25° C. However, in order to improve the handling of the composition at deaeration, pouring or injecting into the mold, etc., it is recommended to provide viscosity in the range of 2 to 100 Pa·s, preferably 5 to 50 Pa·s.

The cured silicone product is obtained by heating and curing the composition at a temperature in the range of 100 to 250° C. The cured silicone product of the invention should have JIS K6253 type-A durometer hardness in the range of 77-95, preferably in the range of 80 to 90. If type-A hardness of the cured product is below the recommended lower limit, the surface of the product will either become sticky and easily fouled, or this will impair handlability of the cured products. If, on the other hand, hardness of the cured product exceeds the recommended upper limit, the product will not be sufficiently flex-resistant. It is especially important from the viewpoint of moldability and handlability to provide the cured silicone products with non-sticky surfaces when such products are made in the form of thin plates, thin rods, or parts having microscopic dimensions. For such applications, it is recommended that type-A hardness should be in the range of 80 to 90.

In order that the cured silicone product of the invention possess sufficient flex-resistant, it should have JIS K6251 elongation not less than 38%. If JIS K6251 elongation is less than the recommended lower limit, the cured silicone product will not have sufficient flex-resistant. The product is considered flex-resistant if a 1 mm-thick cured silicone plate does not acquire cracks or damages after being folded at an angle of 180°.

The cured silicone product possesses high transparency. More specifically, the product is considered highly transparent if a transmittance of parallel rays passing through a 6-mm-thick cured silicone plate and measured in accordance with JIS K7105 is equal to or greater than 90%. The product with such a property can be considered suitable for optical applications.

The cured silicone product of the invention may form a composite product by integrating it with various substrates. The substrates may be comprised of various metals, thermoplastic resins, thermosetting resins, silicone rubber, or a similar rubber, Nylon or polyester fiber fabric, an electronic device, or a light-emitting element. The composite product is formed by applying the composition of the invention onto the substrate and then curing the composition by heating.

EXAMPLES

The curable silicone composition of the invention will now be described in more details with reference to practical and comparative examples. But, the present invention is not limited only thereto. In the examples, all values of viscosity were measured at 25° C., and all parts are parts by mass.

The designations used in the examples for components (A) through (C) and curing retarders, as well as the definitions of the components are shown below. In the examples, Vi designates vinyl groups, and Me designates methyl groups.

Constituent (A-1)
a-1: dimethylpolysiloxane having viscosity of 2,000 mPa·s and capped at both molecular terminals with dimethylvinylsiloxy groups. Vinyl group content: 0.23 mass %.
a-2: dimethylpolysiloxane having viscosity of 11,000 mPa·s and capped at both molecular terminals with dimethylvinylsiloxy groups. Vinyl group content: 0.14 mass %.
a-3: dimethylpolysiloxane having viscosity of 40,000 mPa·s and capped at both molecular terminals with dimethylvinylsiloxy groups. Vinyl group content: 0.09 mass %.

Constituent (A-2)
a-4: organopolysiloxane represented by the following average unit formula $(ViMe_2SiO_{1/2})_{0.11}(Me_3SiO_{1/2})_{0.33}(SiO_{4/2})_{0.57}$. Mass-average molecular weight: 4600. Vinyl group content: 4.0 mass %.
a-5: organopolysiloxane represented by the following average unit formula $(ViMe_2SiO_{1/2})_{0.15}(Me_3SiO_{1/2})_{0.29}(SiO_{4/2})_{0.57}$. Mass-average molecular weight: 4600. Vinyl group content: 5.5 mass %.
a-6: organopolysiloxane represented by the following average unit formula $(ViMe_2SiO_{1/2})_{0.4}(Me_3SiO_{1/2})_{0.40}(SiO_{4/2})_{0.56}$. Mass-average molecular weight: 4600. Vinyl group content: 1.5 mass %.
a-7: organopolysiloxane represented by the following average unit formula $(ViMe_2SiO_{1/2})_{0.14}(Me_3SiO_{1/2})_{0.48}(SiO_{4/2})_{0.39}$. Mass-average molecular weight: 2500. Vinyl group content: 5.0 mass %.
a-8: organopolysiloxane represented by the following average unit formula $(ViMe_2SiO_{1/2})_{0.09}(Me_3SiO_{1/2})_{0.34}(SiO_{4/2})_{0.57}$. Mass-average molecular weight: 4600. Vinyl group content: 3.5 mass %.

Component B
b-1: organopolysiloxane represented by the following average unit formula $(HMe_2SiO_{1/2})_8(SiO_{4/2})_4$. Kynematic viscosity: 18 mm²/s. Content of silicon-bonded hydrogen atoms: 0.97 mass %.
b-2: polymethylhydrogensiloxane capped at both molecular terminals with trimethylsiloxy groups and having kynematic viscosity of 21 mm²/s. Content of silicon-bonded hydrogen atoms: 1.57 mass %.
b-3: a copolymer of methylhydrogensiloxane and dimethylsiloxane capped at both molecular terminals with trimethylsiloxy groups. Kynematic viscosity: 5 mm²/s. Content of silicon-bonded hydrogen atoms: 0.75 mass %.
b-4: a copolymer of methylhydrogensiloxane and dimethylsiloxane capped at both molecular terminals with trimethylsiloxy groups. Kynematic viscosity: 5 mm²/s. Content of silicon-bonded hydrogen atoms: 0.45 mass %.

Component C
Platinum-type catalyst: 1,3-divinyhetramethyldisiloxane solution of a plationum/3-divinyltetramethyldisiloxane complex. Metallic platinum content: about 4000 ppm.

Curing Retarder
3,5-dimethyl-1-octyn-3-ol

Practical Examples 1-10, Comparative Examples 1 to 9

Curable silicone compositions were prepared by uniformly mixing the components shown in Tables 1 to 3 in proportions indicated in the same tables. One portion of the obtained compositions was heated for 5 min. at 150° C. and formed into 1 mm-thick cured sheets the materials of which were tested for tensile strength, elongation, and flex-resistant. Another portion of the obtained compositions was heated for 10 min. at 150° C. for forming a 6 mm-thick silicone product which was tested with regard to hardness and transmittance of parallel light rays. The results of the tests are shown in Tables 1 through 3. The SiH/Vi values shown in Tables 1 through 3 designate ratios of the mole numbers of silicon-bonded hydrogen atoms contained in component (B) to 1 mole of vinyl groups contained in constituents (A-1) and (A-2). In Tables 1 and 2, (A-2) Vi % designates mass % of vinyl groups contained in constituent (A-2) (in case of a mixture, these symbols designate mass % of vinyl groups in the mixture). In Table 3, SiH % designates mass % of silicon-bonded hydrogen atoms in component (B) (in case of a mixture, these symbols designate mass % of hydrogen atoms in the mixture)

[Testing, Measuring, and Evaluating Procedures]

Physical properties of the silicone cured bodies (hardness, tensile strength, elongation, and light transmittance) were tested, measured, and evaluated by the methods described below. Also described below is a flex-resistant test.

(1) Hardness

The curable silicone compositions were cured by heating at 150° C. for 10 min., whereby 6 mm-thick cured silicone products were obtained. Hardness of the silicone products was measured by a type-A durometer according to JIS K 6253.

(2) Tensile Strength and Elongation

A 1-mm thick cured silicone bodies were produced by heating the curable silicone compositions for 5 min. at 150° C. Tensile strength and elongation were measured according to JIS K 6251.

(3) Flex-resistant Test 1 mm-thick sheets were produced by curing the curable silicone compositions for 5 min. at 150° C., and No. 4 dumbbell specimens were stamped out from the obtained sheets. The flex-resistant test was carried out by the following method. Each obtained specimen was folded by 180° over the central part. Following this, a 500 g load having diameter of 4 cm and height of 4 cm was placed onto the aforementioned central part of the dumbbell specimen for 2 sec., the load was removed, and the condition of the inspected part was observed with regard to occurrence of whitening, cracks, or breaks. Those specimens that developed whitening, cracks, or breaks were considered not passing the test.

(4) Light Transmittance 6 mm-thick cured silicone sheets were produced by heating and curing the curable silicone compositions for 10 min. at 150° C. Transmittance of parallel light rays through the cured silicone sheet was measured according to JIS K 7105 by means of a Water Analyzer—200N of Nippon Denshoku Kogyo Co., Ltd. Air was used as a reference medium.

TABLE 1

|  | Practical Examples | | | | |
| --- | --- | --- | --- | --- | --- |
|  | 1 | 2 | 3 | 4 | 5 |
| (A-1) (parts) | | | | | |
| a-1 | — | — | — | — | — |
| a-2 | 56 | 56 | 57 | 59 | 60 |
| a-3 | — | — | — | — | — |
| (A-2) (parts) | | | | | |
| a-4 | — | — | 43 | 27.5 | 13.6 |
| a-5 | — | 22 | — | 13.5 | 26.4 |
| a-6 | — | 22 | — | — | — |
| a-7 | — | — | — | — | — |
| a-8 | 44 | — | — | — | — |
| (A-2) Vi % | 3.5 | 3.5 | 4 | 4.5 | 5 |
| (B) (parts) | | | | | |
| b-1 | 10.4 | 10.4 | 10.7 | 11.4 | 12.3 |
| (C) (parts) | 0.08 | 0.08 | 0.08 | 0.08 | 0.08 |
| Curing retarder (parts) | 0.1 | 0.1 | 0.1 | 0.1 | 0.1 |
| SiH/Vi | 1.5 | 1.5 | 1.5 | 1.5 | 1.5 |
| Hardness | 87 | 87 | 89 | 87 | 87 |
| Tensile strength(MPa) | 6.5 | 9.5 | 8.5 | 9 | 6 |
| Elongation (%) | 42 | 55 | 43 | 55 | 40 |
| Transmittance of parallel rays (%) | 93 | 93 | 93 | 93 | 93 |
| Flex-resistant test | Pass | Pass | Pass | Pass | Pass |

TABLE 2

|  | Comparative Examples | | | | | | | |
| --- | --- | --- | --- | --- | --- | --- | --- | --- |
|  | 1 | 2 | 3 | 4 | 5 | 6 | 7 | 8 |
| (A-1) (parts) | | | | | | | | |
| a-1 | — | — | — | 57 | — | — | — | — |
| a-2 | 45 | 56 | 61 | — | — | 50 | 70 | 54 |
| a-3 | — | — | — | — | 62 | — | — | — |
| (A-2) (parts) | | | | | | | | |
| a-4 | — | — | — | 43 | 38 | 50 | 30 | 34 |
| a-5 | — | — | 39 | — | — | — | — | — |
| a-6 | 55 | 11 | — | — | — | — | — | — |
| a-7 | — | — | — | — | — | — | — | 12 |
| a-8 | — | 33 | — | — | — | — | — | — |
| (A-2) Vi % | 1.5 | 3 | 5.5 | 4 | 4 | 4 | 4 | 4.3 |
| (B) (parts) | | | | | | | | |
| b-1 | 5.4 | 8.4 | 13.2 | 11 | 9.4 | 12.2 | 7.7 | 12.2 |
| (C) (parts) | 0.08 | 0.08 | 0.08 | 0.08 | 0.08 | 0.08 | 0/08 | 0.08 |
| Curing retarder (parts) | 0.1 | 0.1 | 0.1 | 0.1 | 0.1 | 0.1 | 0.1 | 0.1 |
| SiH/Vi | 1.5 | 1.5 | 1.5 | 1.5 | 1.5 | 1.5 | 1.5 | 1.5 |
| Hardness | 86 | 87 | 87 | 86 | 86 | 92 | 62 | 87 |
| Tensile strength (MPa) | 3 | 3.9 | 4 | 6 | 8.8 | 3 | 11 | 6.4 |
| Elongation (%) | 10 | 30 | 35 | 25 | 45 | 15 | 94 | 28 |
| Transmittance of parallel rays (%) | 93 | 93 | 93 | 93 | 80 | 93 | 93 | 93 |
| Flex-resistant test | Did not pass | Did not pass | Did not pass | Did not pass | Pass | Did not pass | Pass | Did not pass |

TABLE 3

|  | Practical Examples | | | | | Comp. Ex. |
|---|---|---|---|---|---|---|
|  | 6 | 7 | 8 | 9 | 10 | 9 |
| (A-1) (parts) | | | | | | |
| a-1 | — | — | — | — | — | — |
| a-2 | 59 | 59 | 59 | 57 | 57 | 59 |
| a-3 | — | — | — | — | — | — |
| (A-2) (parts) | | | | | | |
| a-4 | 41 | 41 | 41 | 41 | 43 | 41 |
| (B) (parts) | | | | | | |
| b-1 | 10.7 | 5.35 | — | — | 6 | — |
| b-2 | — | 3.28 | 6.56 | — | — | — |
| b-3 | — | — | — | 13.9 | — | — |
| b-4 | — | — | — | — | — | 23 |
| SiH % | 0.97 | 1.15 | 1.57 | 0.75 | 0.97 | 0.45 |
| (C) (parts) | 0.08 | 0.08 | 0.08 | 0.08 | 0.08 | 0.08 |
| Curing retarder (parts) | 0.03 | 0.03 | 0.03 | 0.03 | 0.1 | 0.03 |
| SiH/Vi | 1.5 | 1.5 | 1.5 | 1.5 | 0.8 | 1.5 |
| Hardness | 88 | 80 | 77 | 77 | 77 | 63 |
| Tensile strength (MPa) | 10.4 | 10.6 | 9.2 | 11 | 9.5 | 6.5 |
| Elongation (%) | 44 | 52 | 134 | 77 | 100 | 87 |
| Transmittance of parallel rays (%) | 93 | 92 | 91 | 93 | 92 | 83 |
| Flex-resistant test | Pass | Pass | Pass | Pass | Pass | Pass |

Practical Example 11

A Ross mixer was loaded with 100 parts of a dimethylpolysiloxane having viscosity of 40,000 mPa·s and capped at both molecular terminals with dimethylvinylsiloxy groups (content of vinyl groups: about 0.09 mass %), 40 parts of fumed silica with BET specific surface area of 225 m²/g, 7 parts of hexamethyldisilazane, and 2 parts of water. The components were uniformly mixed at room temperature, and the mixture was heat treated at 200° C. for 2 hours under a reduced pressure. As a result, a flowable master batch was produced.

A curable silicone rubber composition was prepared by uniformly mixing 45 parts of the obtained master batch with the following components: 53 parts of a dimethylpolysiloxane having viscosity of 40,000 mPa·s and capped at both molecular terminals with dimethylvinylsiloxy groups; 0.63 parts of a copolymer of a methylhydrogensiloxane and a dimethylsiloxane having kynematic viscosity of 5 mm²/s and capped at both molecular terminals with trimethylsiloxy groups (content of silicon-bonded hydrogen atoms: about 0.70 mass %); 0.3 parts of a 1,3-divinyltetramethyldisisloxane solution of a platinum/1,3-divinyltetramethyldisoloxane complex (content of metallic platinum: about 4000 ppm); and 0.017 parts of 3,5-dimethyl-1-octyn-3-ol (curing retarder).

The above-described curable silicone composition was heated for 5 min. at 150° C. and formed into a 2 mm-thick cured silicone rubber sheet.

The obtained cured silicone rubber sheet was coated with a 0.5 mm-thick layer of the curable silicone composition of Practical Example 3 shown in Table 1, and the coated unit was held for 5 min. in an oven at 150° C. As a result, an integral solid composite product composed of the cured silicone product and silicone rubber was formed. The cured silicone rubber layer could not be removed even with a metal spatula. When the composite product of the cured silicone product and silicone rubber was deformed, the cured silicone layer remained in contact with the silicone rubber, and no extraordinary peeling, breakage, or whitening was noticed even after the composite product was folded by 180°.

Comparison of the results of Practical Examples 1 to 5 and Comparative Examples 1 to 3 shows that the cured silicone composition with the content of vinyl groups of constituent (A-2) in the range of 3.5 to 4 mass % provides a cured product which is superior in its flex-resistant to the cured product obtained from the compositions having content of vinyl groups less than 3.5 mass % and greater than 5 mass %.

Comparison of the results of Practical Example 3 with Comparative Example 4 shows that the curable silicone composition with viscosity of constituent (A-1) in the range of 5,000 to 35,000 mPa·s provides a cured product which is superior in its flex-resistant to the cured product obtained from the compositions having viscosity of constituent (A-1) equal to 2,000 mPa·s.

Comparison of the results of Practical Example 3 with Comparative Example 5 shows that the curable silicone composition with viscosity of constituent (A-1) in the range of 5,000 to 35,000 mPa·s provides a cured product which is superior in its transparency to the cured product obtained from the compositions having viscosity of constituent (A-1) equal to 40,000 mPa·s.

Comparison of the results of Practical Examples 1 to 5 with Comparative Example 6 shows that the curable silicone composition with the content of constituent (A-2) in the range 38 to 48 mass % of component (A) provides a cured product which is superior in its flex-resistant to the cured product obtained from the compositions having the content of constituent (A-2) equal to 50 mass % of component (A).

Comparison of the results of Practical Examples 1 to 5 with Comparative Example 7 shows that the curable silicone composition with the content of constituent (A-2) in the range 38 to 48 mass % of component (A) provides a cured product which is sufficiently harder than the cured product obtained from the compositions having the content of constituent (A-2) equal to 30 mass % of component (A).

Comparison of the results of Practical Examples 3 and 4 with Comparative Example 8 shows that the curable silicone composition with the ratio of the sum of the mole numbers of the $R^1_2R^2SiO_{1/2}$ units and $R^1_3SiO_{1/2}$ units to 1 mole of the $SiO_{4/2}$ units in the range from 0.5 to 1.4 provides a cured product which is superior in its flex-resistant to the cured product obtained from the composition having the ratio of the sum of the mole numbers of the $R^1{}_2R^2SiO_{1/2}$ units and $R^1{}_3SiO_{1/2}$ units to 1 mole of the $SiO_{4/2}$ units equal to 1.6.

Comparison of the results of Practical Examples 6 to 9 with Comparative Example 9 shows that the curable silicone composition with the content of the silicon-bonded hydrogen atoms of component (B) greater than 0.7 mass % provides a cured silicone product which is superior in its transparency to the cured silicone product having the content of the silicon-bonded hydrogen atoms of component (B) equal to 0.45 mass %.

Comparison of the results of Practical Examples 1 to 7 with Comparative Examples 8 and 9 shows that the curable silicone composition that contains 50 to 100% of component (B) in the form of an organopolysiloxane having at least 0.7 mass % of silicon-bonded hydrogen atoms and composed of $SiO_{4/2}$ units and $HR^3{}_2SiO_{1/2}$ units is superior in its hardness to the curable silicone composition that is comprised only of the linear organopolysiloxane that has at least 0.7 mass % of silicon-bonded hydrogen atoms and contains methyl groups as silicon-bonded groups other than silicon-bonded hydrogen atoms.

INDUSTRIAL APPLICABILITY

Since the curable silicone composition of the present invention is capable of producing a flex-resistant, highly transparent cured silicone product that has a non-tacky surface, the cured product of the composition is suitable for use as an optical material transmissive to visible light, infrared light, ultraviolet rays, far-ultraviolet rays, X-rays, laser beams, etc. Furthermore, since the curable silicone composition of the invention can be applied onto substrates made from silicone rubber, Nylon fiber fabric, polyester fiber fabric, or the like, and then cured by heating for forming a flex-resistant, highly transparent silicone layer integral with the substrate and having a non-sticky surface, the composition is suitable for use as a coating material and a material for forming a surface layer.

The cured silicone product of the invention is transmissive to visible light, infrared light, ultraviolet rays, far-ultraviolet rays, X-rays, laser beams, etc. Therefore the cured silicone product can be used as an optical material. Moreover, the cured silicone product of the invention can be used as an optical material that possesses fold-resistant properties and can be folded during use. In addition, the composition is characterized by excellent moldability and handlability. Therefore the composition of the invention is suitable for forming optical parts that have microscopic dimensions, super-thin thickness, or delicate contours. When the cured silicone product is integrated with various substrates, it is expected that the highly transparent and flex-resistant cured silicone layer formed on the substrate may work as a shock-absorbing and stress-relaxing member.

The invention claimed is:

1. A curable silicone composition capable of producing a flex-resistant, highly transparent cured silicone product having JIS K6253 type-A durometer hardness in the range of 77 to 95 and JIS K6251 elongation equal to or greater than 38%, the aforementioned curable silicone composition comprising:

100 parts by mass of an alkenyl-containing organopolysiloxane (A) comprising: a dialkylpolysiloxane (A-1) that constitutes 52 to 69 mass % of component (A), contains on average at least 2 alkenyl groups in one molecule and has a 25° C. viscosity in the range of 5,000 to 35,000 mPa·s; and a alkenyl-containing organopolysiloxane resin (A-2) that constitutes 31 to 48 mass % of component (A), consists essentially of $SiO_{4/2}$ units, $R^1{}_2R^2SiO_{1/2}$ units, and $R^1{}_3SiO_{1/2}$ units (where $R^1$ designates alkyl groups with 1 to 10 carbon atoms, and $R^2$ designates alkenyl groups), has the content of alkenyl groups ranging from 3.5 to 5.0 mass %, and the ratio of the sum of the mole numbers of the $R^1{}_2 R^2SiO_{1/2}$ units and $R^1{}_3SiO_{1/2}$ units to 1 mole of the $SiO_{4/2}$ units ranges from 0.5 to 1.4;

an organopolysiloxane (B) wherein silicon-bonded hydrogen atoms are in an amount of at least 0.7 mass % and wherein silicon-bonded groups other than hydrogen atoms are alkyl groups having 1 to 10 carbon atoms, with component (B) containing silicon-bonded hydrogen atoms in the amount of 0.7 to 5 moles per 1 mole of the total amount of alkenyl groups of component (A); and a catalytic quantity of a hydrosilylation catalyst (C).

2. The curable silicone composition of claim 1, wherein component (B) is an organopolysiloxane comprising: an organopolysiloxane (B-1) that constitutes 50 to 100 mass % of component (B), contains at least 0.7 mass % of silicon-bonded hydrogen atoms, and consists essentially of $SiO_{4/2}$ units and $HR^3{}_2SiO_{1/2}$ units, (where $R^3$ designates alkyl groups with 1 to 10 carbon atoms); and a linear-chain organopolysiloxane (B-2) that constitutes 0 to 50 mass % of component (B), wherein silicon-bonded hydrogen atoms are in an amount of at least 0.7 mass % and wherein silicon-bonded groups other than hydrogen atoms are alkyl groups having 1 to 10 carbon atoms.

3. The curable silicone composition of claim 2, wherein the dialkylpolysiloxane (A-1) has a viscosity in the range of 10,000 to 35,000 mPa·s at 25° C.

4. The curable silicone composition of claim 1, wherein the dialkylpolysiloxane (A-1) has a viscosity in the range of 10,000 to 35,000 mPa·s at 25° C.

5. A composite cured silicone product comprising an integral unit of a substrate and a cured silicone layer obtained by thermally curing the curable silicone composition of claim 1 on the substrate.

6. A composite cured silicone product obtained by applying a curable silicone composition as claimed in claim 1 on a substrate and then thermally curing the applied composition.

7. The curable silicone composition of claim 1, wherein the dialkylpolysiloxane (A-1) constitutes 52 to 65 mass % of component (A) and wherein the alkenyl-containing organopolysiloxane resin (A-2) constitutes 35 to 48 mass % of component (A).

8. The curable silicone composition of claim 7, wherein the dialkylpolysiloxane (A-1) has a viscosity in the range of 11,000 to 32,000 mPa·s at 25° C.

9. A flex-resistant, highly transparent cured silicone product having JIS K6253 type-A durometer hardness in the range of 77 to 95 and JIS K6251 elongation equal to or greater than 38%, the aforementioned cured silicone product being obtained by thermally curing a curable silicone composition comprising:

100 parts by mass of an alkenyl-containing organopolysiloxane (A) comprising: a dialkylpolysiloxane (A-1) that constitutes 52 to 65 mass % of component (A), contains on average at least 2 alkenyl groups in one molecule and has a 25° C. viscosity in the range of 5,000 to 35,000 mPa·s; and a alkenyl-containing organopolysiloxane resin (A-2) that constitutes 35 to 48 mass % of component (A), consists essentially of $SiO_{4/2}$ units, $R^1{}_2R^2SiO_{1/2}$ units, and $R^1{}_3SiO_{1/2}$ units (where $R^1$ designates alkyl groups with 1 to 10 carbon atoms, and $R^2$ designates alkenyl groups), has the content of alkenyl groups ranging from 3.5 to 5.0 mass %, and the ratio of the sum of the mole numbers of the $R^1{}_2 R^2SiO_{1/2}$ units and $R^1{}_3SiO_{1/2}$ units to 1 mole of the $SiO_{4/2}$ units ranges from 0.5 to 1.4;

an organopolysiloxane (B), wherein silicon-bonded hydrogen atoms are present in an amount of at least 0.7 mass % and wherein silicon-bonded groups other than hydrogen atoms are alkyl groups having 1 to 10 carbon atoms, with component (B) containing silicon-bonded hydrogen atoms in the amount of 0.7 to 5 moles per 1 mole of the total amount of alkenyl groups of component (A)}; and a catalytic quantity of a hydrosilylation catalyst (C).

10. The flex-resistant, highly transparent cured silicone product according to claim 9, wherein component (B) is an organopolysiloxane comprising: an organopolysiloxane (B-1) that constitutes 50 to 100% of component (B), contains at least 0.7 mass % of silicon-bonded hydrogen atoms, and consists essentially of $SiO_{4/2}$ units and $R^3{}_2HSiO_{1/2}$ units (where $R^3$ designates alkyl groups with 1 to 10 carbon atoms); and a linear-chain organopolysiloxane (B-2) that constitutes 0 to 50 mass % of component (B), wherein silicon-bonded hydrogen atoms are present in an amount of at least 0.7 mass % and wherein silicon-bonded groups other than hydrogen atoms are alkyl groups having 1 to 10 carbon atoms.

11. The flex-resistant, highly transparent cured silicone product according to claim 10 having type-A durometer hardness according to JIS K6253 in the range of 80 to 90.

12. The flex-resistant, highly transparent cured silicone product according claim 9 having type-A durometer hardness according to JIS K6253 in the range of 80 to 90.

13. The flex-resistant, highly transparent cured silicone product according to claim 9, wherein the dialkylpolysiloxane (A-1) has a viscosity in the range of 11,000 to 32,000 mPa·s at 25° C.

\* \* \* \* \*